April 2, 1940.   F. M. GUY   2,195,647
MOTOR VEHICLE
Filed Oct. 27, 1937   2 Sheets-Sheet 2

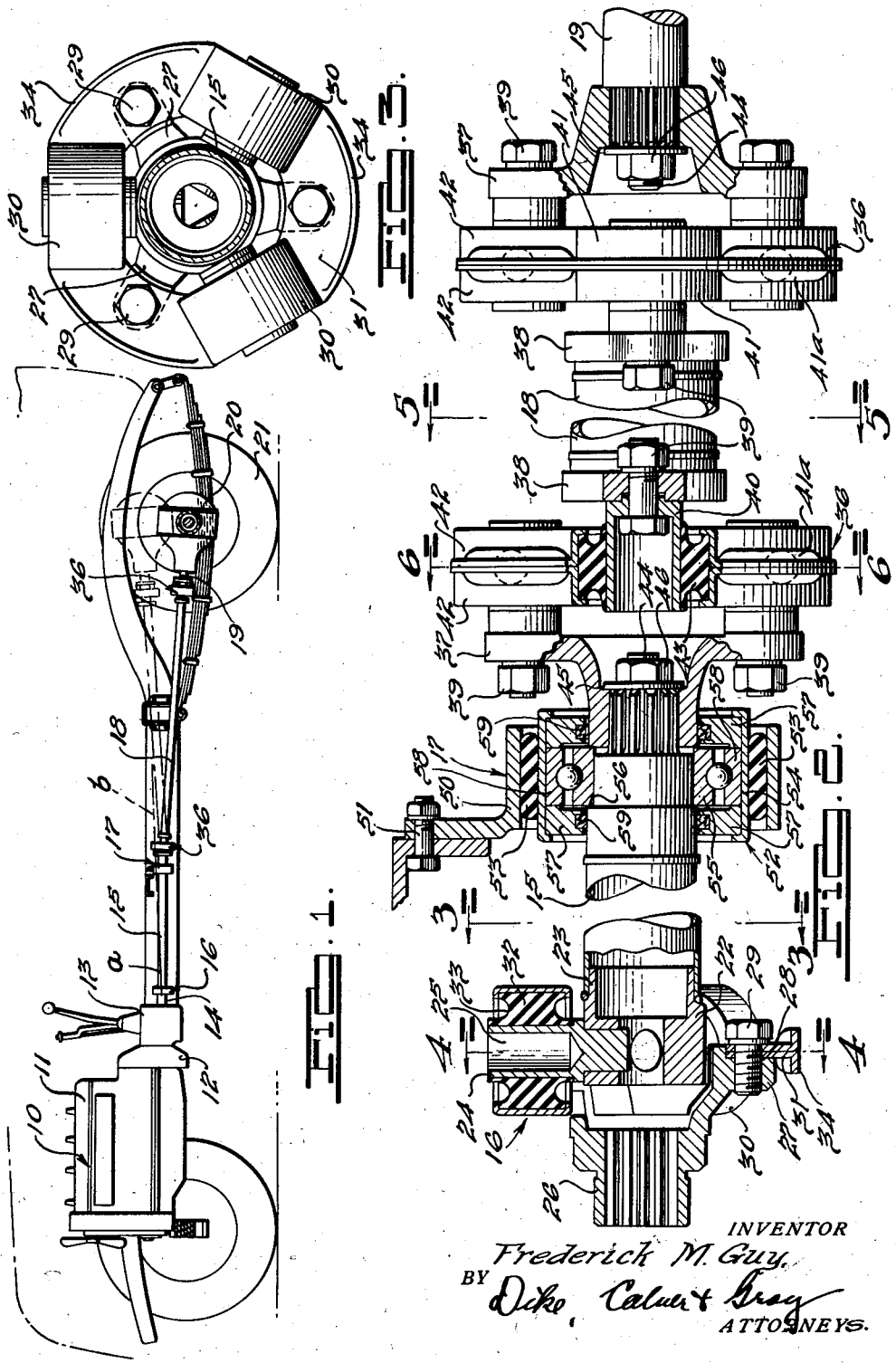

INVENTOR
Frederick M. Guy.
BY
ATTORNEYS.

Patented Apr. 2, 1940

2,195,647

UNITED STATES PATENT OFFICE 2,195,647

MOTOR VEHICLE

Frederick M. Guy, Detroit, Mich., assignor to Guy and Murton, Incorporated, Detroit, Mich., a corporation of Michigan Application October 27, 1937, Serial No. 171,253

5 Claims. (Cl. 180—70)

This invention relates to motor vehicles and more particularly to such motor vehicles as have their engines and their driving axles mounted at the opposite ends of the vehicle, the engine and the driving axle of such a vehicle being connected by means of a suitable propeller shaft provided with flexible or universal couplings or joints.

One of the objects of the present invention is to provide a motor vehicle having a low-set body in which the arched floor tunnel, above the propeller shaft, is eliminated.

Another object of the invention is to provide a motor vehicle in which the propeller shaft is floatingly mounted and is permitted to rotate around an axis passing through the center of gravity of the shaft, rather than around its geometric axis.

Still another object of the invention is to provide a motor vehicle having a propeller shaft resiliently mounted in rubber, and connected by flexible universal joints or couplings arranged in a manner to prevent such longitudinal movements of the propeller shaft as cause scuffing of surfaces of the resilient mounting members.

A further object of the invention is to provide a motor vehicle in which slip joints in the propeller shaft are eliminated thus providing a less expensive construction while at the same time providing a more true running shaft.

A still further object of the invention is to provide an improved motor vehicle in which the propeller shaft is made of connected short sections which provide for transmission of power through a considerable angle of relative movement which sections are so mounted and connected that "whipping" of the propeller shaft is substantially eliminated.

A still further object of the invention is to provide a motor vehicle of the character specified in the preceding paragraph, in which the propeller shaft made up of a plurality of short sections, is of such a construction as to insure successful operation with flexible universal joint connections which provide for all misalignments of the connected shafts. The construction being such that the high stresses and friction in such an assembly due to rigid universal couplings commonly used are overcome.

It is an added object of the present invention to provide an improved motor vehicle of the foregoing character which is relatively simple in construction, dependable in operation, and relatively easy to repair or service.

Other objects of this invention will appear in the following description and appended claims, reference being had to the accompanying drawings forming a part of this specification wherein like reference characters designate corresponding parts in the several views.

Fig. 1 is a side view of the chassis of a motor vehicle constructed in accordance with one embodiment of the present invention.

Fig. 2 is a side view, partly in section, of the sub-shaft and the propeller shaft assembled.

Fig. 3 is a sectional view in the direction of the arrows, the section being taken on the line 3—3 of Fig. 2.

Figure 4:
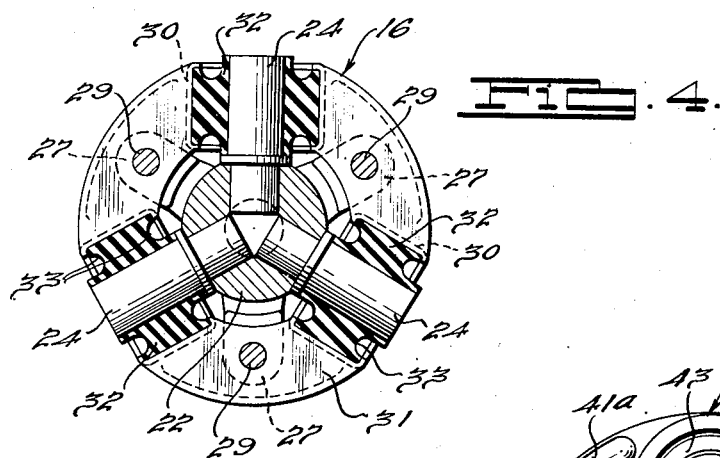
Fig. 4 is a sectional view, looking in the direction of the arrows, the section being taken on the line 4—4 of Fig. 2.
Figure 5:
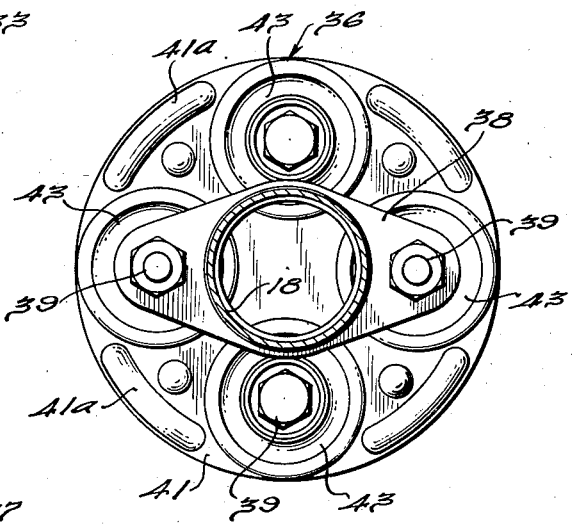
Fig. 5 is a view partly in section taken in the direction of the arrows from the section plane 5—5 of Fig. 2.
Figure 6:
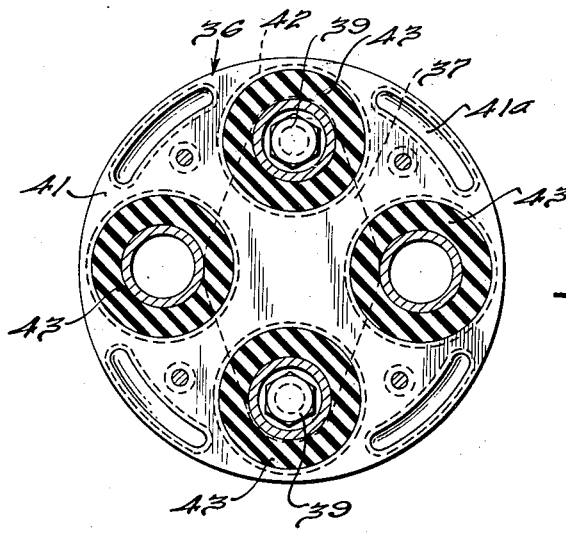
Fig. 6 is a view in the direction of the arrows of the universal coupling in transverse vertical section taken on the line 6—6 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle constructed in accordance with one embodiment of the present invention. Referring to the drawings and particularly to Fig. 1, the vehicle comprises a power plant assembly 10 including an engine 11, a clutch 12 and a transmission 13 operatively connected to said engine and secured to the housing thereof. The end of the transmission shaft 14 extends towards the rear of the vehicle and is operatively connected with a horizontally extending sub-shaft 15 by means of a universal or flexible coupling indicated generally by the numeral 16. At the rear end of the sub-shaft 15 there is provided a supporting ring indicated generally by the numeral 17 serving for the purpose of supporting the rear end of the shaft at the sprung structure of the vehicle. As shown, a tubular propeller shaft 18 is operatively connected to the sub-shaft 15 and to a final drive shaft 19 of a conventional rear axle 20 carrying driving wheels 21. The rear axle 20 is operatively suspended on the vehicle frame by means of a known construction referred to in the art as the Hotchkiss drive. This construction is well known in the art and is illustrated in Fig. 1 with clarity sufficient for the purposes of the present invention.

The coupling 16 comprises a cylindrical member 22 having an end 23 fitted into the end of the tubular sub-shaft 15 and welded or otherwise secured thereto. The cylindrical surface of the member 22 is milled off in a plurality of places for the convenient securing thereto of a plurality of radially extending studs 24, three of said studs being employed in a preferred embodiment of the invention as here shown. The studs 24 are preferably drilled out as indicated at 25 in order to decrease the weight and the inertia mass of the studs. The splined member 26 is adapted to engage the end of the transmission shaft 14 and has a plurality of lugs or prongs 27 provided with tapped holes 28. Two similar annular members, made preferably of sheet steel by stamping operations, are secured to the member 26 by means of screws 29 engaging said member at the holes 28 as is best shown in Figs. 2 and 3. Semi-cylindrical portions 30, three of which are provided on each of the members 31, form, when the members are flatly arranged against each other, cylindrical nests extending radially and encircling the studs 24. In the space between the outside cylindrical surfaces of the studs and the inside cylindrical surfaces of the nests there are arranged rubber bushings 32 mounted on the studs 24 and clamped at their peripheral surfaces by the semi-cylindrical portions 30. At the surfaces of contact of rubber and metal, the rubber is bonded to the metal. The rubber bushings 32 are relieved at their faces as indicated at 33 in order to effect a substantially uniform deflection of the rubber throughout the entire mass of the bushing when torque is transmitted thereby. The cylindrical surface of contact between the studs and the rubber bushings is made longer than the surface of contact of the rubber bushings and the nests formed in the members 31, in order to produce the same area of contact between the metal and rubber at both surfaces in spite of the smaller diameter of the bonded surface at the studs. The members 31 are made more rigid by the provision of flanges 34. Thus, a resilient driving connection is effected between the transmission shaft 14 and the sub-shaft 15, radial arrangement of the rubber bushings making them particularly effective to resist resiliently the end thrust which may be exerted on the sub-shaft 15 during operation of the shaft.

The tubular propeller shaft 18 is operatively connected with the sub-shaft 15 and the final drive shaft 19 by means of two similar couplings 36. Each of said couplings comprises a splined fork member 37 adapted to engage the splined end of the sub-shaft and the final drive shaft, respectively, and a similar fork member 38 having an end fitted into the tubular end of the propeller shaft and welded or otherwise secured thereto. To the fingers or prongs of the fork members are secured by means of bolts 39, four hollow studs 40 extending substantially parallel to the axis of the respective shaft, one stud being provided on each prong. Two similar annular members 41 arranged one against the other and riveted or otherwise secured together are disposed between the members 37 and 38. Cylindrical portions 42 are formed on said members 41 for providing passages for the studs and nests for the rubber bushings 43 mounted on the studs 40 and bonded to the surfaces of both stamped members 42 and studs 40. The studs and bushings are equidistantly arranged, construction of the rubber bushings 43 being substantially similar to that of the bushings 32 of the coupling 16. Beads 41a may be provided to increase the rigidity of the members 41. By virtue of the above construction resilient driving connections are effected between the propeller shaft, the subshaft and the final drive shaft, the couplings 36 being particularly effective to carry the axial loads imposed on the connected shafts while permitting angular misalignments thereof.

It should be noted that the splined fork member 37 of the rear coupling 36 is connected to the final drive shaft 19 in such a way that relative slippage of the shaft and splined member is prevented. I prefer to use a bolt and nut arrangement in which a threaded portion 44 is formed on the end of the externally splined shaft. A washer 45 is pressed against the shoulders of the fork member by means of a nut 46 serving to press the fork member against the shoulders provided on the externally splined shaft.

The rear end of the sub-shaft 15 is preferably supported on an annular bracket or ring 50 secured to the vehicle frame in any suitable way, such as by means of a bolt 51. The ring 50 encircles a ball bearing 52 secured on the end of the sub-shaft 15, a rubber washer 53 being provided between the outside shell 54 of the ball bearing and the bracket 50. When the structure is assembled, the inner ring 55 of the ball bearing is firmly pressed toward and to the shoulder 56 of the sub-shaft 15. The end of the splined fork member 37 of the front coupling 36 is held thereon by the nut 46 and the washer 45 as explained. The rings 57 engage the outer ring 58 of the bearing and are clamped thereto by the shell 54. Grease seals 59 are provided on said rings 57. By virtue of such a construction the end thrust exerted on the sub-shaft 15 by the propeller shaft is transmitted thereto through the inner ring 55 of the ball bearing without imposing any stresses on the races and balls of the bearings and interfering with the operation thereof. The slight end thrust imposed on the ball bearing because of the engagement thereof with the rubber washer 53 is easily carried by the bearing structure.

In view of the above described construction the propeller shaft is made of a shorter length than what it would be if a conventional structure of the vehicle were employed. The shortening of the lengths of the sections of the propeller shaft eliminates whipping thereof at high speeds and permits elimination of the arched tunnel usually provided in the floor structure of the body above the shaft. From an examination of Fig. 1 it can be clearly understood that if the propeller shaft is connected to the transmission shaft without the use of the sub-shaft, the axis of the propeller shaft in the uppermost position thereof would extend from the center of the rear axle when the same is in its upper position. In such case said axis would substantially coincide with a dotted line a—b, indicated in Fig. 1, the position whereof is considerably higher than the position of the front end of the propeller shaft 18 of the present invention as indicated by dotted lines in Fig. 1.

Because of the use of resilient elements in the couplings, high angle misalignments of the shafts do not produce excessive stresses in the couplings or friction between their working surfaces, as has been the case with motor vehicles where all metal universal couplings were utilized with short propeller shafts.

Because of the resilient or floating suspension of the shafts they are permitted to adjust themselves in operation at high speeds to rotate around axes passing through their respective centers of gravity, rather than around their geometric axes. Provision of the coupling 16 at the front end of the sub-shaft 15 prevents excessive endwise movements of the shafts and the resulting scuffing of the rubber bushing 52.

I claim:

1. In a motor vehicle having a power driven transmission shaft and a power driven axle, the combination of a plurality of resiliently connected driving shafts connected between said transmission shaft and said power driven axle, one of said shafts being resiliently supported on the frame of said vehicle and being connected to said transmission shaft by a resilient universal joint adapted to prevent substantial endwise movement of said shafts, and another of said shafts connected between said first named shaft and said power driven axle by resilient universal joints adapted to permit relative endwise movement thereof.

2. In a motor vehicle having a power driven transmission shaft and a power driven axle, the combination of a plurality of resiliently connected driving shafts connected between said transmission shaft and said power driven axle, one of said shafts being resiliently supported on the frame of said vehicle and being connected to said transmission shaft by a resilient universal joint adapted to prevent substantial endwise movement of said shafts, and another of said shafts connected between said first named shaft and said power driven axle by resilient universal joints adapted to permit relative endwise movement thereof, each of said universal joints including concentric driving and driven members connected by a plurality of resilient bushings which are bonded to the adjacent surfaces of said members.

3. In a motor vehicle having a power plant mounted at the front end thereof and a driving axle operatively suspended at the rear end, a transmission shaft extending from the motor toward the rear of the vehicle, a sub-shaft arranged substantially coaxially with said transmission shaft and extending rearwardly thereof, a universal coupling between said transmission shaft and said sub-shaft and adapted to resiliently oppose longitudinal misalignment of said shafts while permitting axial and parallel misalignments thereof, means for resiliently supporting the rear end of said sub-shaft on the vehicle structure, a propeller shaft, and a final drive shaft connected to said driving axle, said propeller shaft drivingly connecting said sub-shaft and said final drive shaft, and a resilient universal coupling on each end of said propeller shaft and adapted to permit substantial longitudinal misalignments thereof with respect to said sub-shaft and said final drive shaft while resiliently opposing axial and radial misalignment thereof.

4. In a motor vehicle having a power plant mounted at the front end thereof and a driving axle operatively connected at the rear end, a transmission shaft extending from the motor toward the rear of the vehicle, a sub-shaft arranged substantially coaxially with said transmission shaft and extending rearwardly thereof, a universal coupling having radially arranged power transmitting rubber members for operatively connecting said transmission shaft and said sub-shaft to resiliently oppose longitudinal misalignments thereof while permitting axial and parallel misalignments thereof, means for resiliently supporting the rear end of said sub-shaft on the vehicle structure; a propeller shaft, and a final drive shaft connected to said driving axle, said propeller shaft drivingly connecting said sub-shaft and said final drive shaft, and two universal couplings, one on each end of the propeller shaft, said couplings including power transmitting rubber members having their longitudinal axes substantially parallel to the longitudinal axes of the connected shafts whereby longitudinal misalignments of said sub-shaft, propeller shaft and the final drive shaft are permitted and axial and parallel misalignments thereof are resiliently opposed.

5. In a motor vehicle having a power plant mounted at the front end thereof and a driving axle operatively suspended at the rear end, a transmission shaft extending from said motor toward the rear of the vehicle; a sub-shaft arranged substantially coaxially with said transmission shaft and extending rearwardly thereof; a universal coupling having radially arranged power transmitting rubber members connecting said transmission shaft and said sub-shaft to permit axial and parallel misalignments thereof while resiliently opposing longitudinal misalignments thereof by the imposition of compression forces on said rubber members; means for resiliently supporting the rear end of said sub-shaft on the vehicle structure, said means comprising a bearing in which the end of said shaft is journalled, a member secured to the sprung vehicle structure, and a rubber member between said bearing and the member secured to the sprung structure of the vehicle; a propeller shaft, and a final drive shaft connected to said driving axle, said propeller shaft drivingly connecting said sub-shaft and said final drive shaft; and two universal couplings, one on each end of the propeller shaft, said couplings including axially arranged power transmitting rubber members, whereby longitudinal misalignments of said transmission shaft, propeller shaft and the final drive shaft are permitted by the elongation of said rubber members and axial and parallel misalignments are resiliently opposed by subjecting said rubber members to compression forces.

FREDERICK M. GUY.